US006993900B2

(12) United States Patent
Upadhyay et al.

(10) Patent No.: US 6,993,900 B2
(45) Date of Patent: Feb. 7, 2006

(54) EXHAUST GAS AFTERTREATMENT SYSTEMS

(75) Inventors: Devesh Upadhyay, Dearborn, MI (US); Michiel J. van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 10/301,282

(22) Filed: Oct. 21, 2002

(65) Prior Publication Data

US 2004/0074229 A1 Apr. 22, 2004

(51) Int. Cl.
*F01N 3/00* (2006.01)

(52) U.S. Cl. .............................. 60/286; 60/274; 60/276; 60/301; 60/303

(58) Field of Classification Search ............... 60/274, 60/276, 285, 286, 295, 301, 303; 422/168, 422/110, 172, 177; 423/212, 235, 239.1
See application file for complete search history.

(56) References Cited

U.S. PATENT DOCUMENTS 5,628,186 A * 5/1997 Schmelz ................. 60/274
5,643,536 A * 7/1997 Schmelz ................. 422/105

(Continued)

FOREIGN PATENT DOCUMENTS

WO WO 99/39809 8/1999

OTHER PUBLICATIONS

IMECE–2002–DSC–32104, "Modeling of a Urea SCR Catalyst with Automotive Applications", Devesh Upadhyay, Michiel Van Nieuwstadt, pp. 1–7Proceedings of ASME: IMECE, Nov.–17, 2002, New Orleans.

IMECE–2002–DSC–32103, "Control Design of an Automotive Urea SCR Catalyst", Devesh Upadhyay, Michiel Van Nieuwstadt, pp. 1–8, Proceedings of ASME: IMECE, Nov.–17, 2002, New Orleans.

*Primary Examiner*—Thomas Denion
*Assistant Examiner*—Diem Tran
(74) *Attorney, Agent, or Firm*—Allan J. Lippa; Alterman Hall McCoy Russell & Tuttle LLP

(57) ABSTRACT

A method is presented for estimating an amount of ammonia stored in a urea-based SCR catalyst based on a dynamic model of the catalyst. The model takes into account chemical and physical properties of the catalyst, such as catalyst volume, the number of available ammonia storage cites, adsorption and desorption dynamics, as well as poisoning, thermal aging, and different catalyst operating temperatures, and generates the estimate based on a measured or estimated amount of NOx in an exhaust gas mixture upstream of the catalyst, an amount of reductant injected into the catalyst to facilitate NOx reduction, and on a measured value of NOx in an exhaust gas mixture downstream of the catalyst. The estimated ammonia storage amount is then used to control the amount of reductant injected into the catalyst to maintain desired ammonia storage amount such that maximum NOx conversion efficiency coupled with minimum ammonia slip are achieved.

13 Claims, 2 Drawing Sheets

U.S. PATENT DOCUMENTS

| | | | |
|---|---|---|---|
| 5,665,318 | A | 9/1997 | Rembold et al. |
| 5,771,689 | A | 6/1998 | Bareis et al. |
| 5,809,775 | A | 9/1998 | Tarabulski et al. |
| 5,849,593 | A * | 12/1998 | Schmelz ................. 436/55 |
| 5,893,267 | A | 4/1999 | Vogtlin et al. |
| 5,924,280 | A | 7/1999 | Tarabulski |
| 5,992,141 | A * | 11/1999 | Berriman et al. .......... 60/274 |
| 6,003,305 | A | 12/1999 | Martin et al. |
| 6,004,524 | A | 12/1999 | Morsbach et al. |
| 6,017,503 | A * | 1/2000 | Kato et al. ................ 423/235 |
| 6,038,854 | A | 3/2000 | Penetrante et al. |
| 6,066,303 | A | 5/2000 | Sudduth et al. |
| 6,125,629 | A | 10/2000 | Patchett |
| 6,171,566 | B1 | 1/2001 | Ku et al. |
| 6,182,443 | B1 | 2/2001 | Jarvis et al. |
| 6,182,444 | B1 * | 2/2001 | Fulton et al. ............ 60/277 |
| 6,192,675 | B1 | 2/2001 | Hirota et al. |
| 6,209,315 | B1 | 4/2001 | Weigl |
| 6,221,324 | B1 | 4/2001 | Coq et al. |
| 6,266,955 | B1 | 7/2001 | Liang et al. |
| 6,269,633 | B1 | 8/2001 | van Nieuwstadt et al. |
| 6,294,141 | B1 | 9/2001 | Twigg et al. |
| 6,299,847 | B1 | 10/2001 | Allen |
| 6,305,160 | B1 | 10/2001 | Hammerle et al. |
| 6,311,480 | B1 | 11/2001 | Suzuki et al. |
| 6,314,722 | B1 | 11/2001 | Matros et al. |
| 6,383,463 | B1 | 5/2002 | Mochida et al. |
| 6,427,439 | B1 * | 8/2002 | Xu et al. ................ 60/286 |
| 6,499,294 | B1 * | 12/2002 | Katoh et al. ............ 60/301 |
| 6,581,374 | B2 * | 6/2003 | Patchett et al. ........... 60/286 |
| 6,737,033 | B1 * | 5/2004 | Hofmann et al. ....... 423/239.1 |
| 2002/0182127 | A1 * | 12/2002 | Braun et al. ............ 423/239.1 |

* cited by examiner

| | Operating Condition | Controller State | |
|---|---|---|---|
| | | FF | FB |
| 1 | $T_{inj} < 175\ degC$ | OFF | OFF |
| 2 | ($T_{inj} > 175\ degC$) AND ($T_{cat} < 200\ degC$) AND ($\theta <= \theta_{threshold}$) | ON | OFF |
| 3 | ($T_{cat} \geq 200\ degC$) AND (Convergence $> \varepsilon$) | ON | OFF |
| 4 | ($T_{cat} \geq 200\ degC$) AND (Convergence $<= \varepsilon$) | OFF | ON |

*Figure - 2*

EXHAUST GAS AFTERTREATMENT SYSTEMS

FIELD OF INVENTION

The present invention relates to an emission control system for diesel and other lean-burn vehicles and, more specifically, to achieving optimal NOx conversion efficiency while minimizing ammonia slip in a urea-based Selective Catalytic Reduction (SCR) catalyst by controlling the ammonia surface coverage fraction of the catalyst.

BACKGROUND AND SUMMARY OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into unregulated exhaust gasses. Vehicles equipped with diesel or other lean burn engines offer the benefit of increased fuel economy, however, catalytic reduction of NOx emissions via conventional means in such systems is difficult due to the high content of oxygen in the exhaust gas. In this regard, Selective Catalytic Reduction (SCR) catalysts, in which NOx is continuously removed through active injection of a reductant into the exhaust gas mixture entering the catalyst, are known to achieve high NOx conversion efficiency. Urea-based SCR catalysts use gaseous ammonia as the active NOx reducing agent. Typically, an aqueous solution of urea is carried on board of a vehicle, and an injection system is used to supply it into the exhaust gas stream entering the SCR catalyst where it decomposes into hydro cyanic acid (NHCO) and gaseous ammonia ($NH_3$), which is then used to convert NOx. However, in such systems, urea injection levels have to be very precisely controlled. Under-injection of urea may result in sub-optimal NOx conversion, while over-injection may cause tailpipe ammonia slip. In a typical urea-based SCR catalyst system, the amount of urea injected is in proportion to the feedgas NOx concentration that represents a trade-off between maximum NOx conversion and minimum ammonia slip.

The inventors herein have recognized a disadvantage with the prior art approach. Namely, this approach requires multiple calibration maps to account for complex behavior of the catalyst with respect to adsorption and desorption of ammonia as a function of engine operating conditions and catalyst deterioration, and is therefore inherently inaccurate.

The inventors herein have also recognized that while NOx conversion efficiency of an SCR catalyst is improved in the presence of adsorbed ammonia, it is not necessary that all of the catalyst storage capacity be utilized by ammonia in order to achieve optimal NOx conversion efficiency. Further, the inventors have recognized that, under certain operating conditions, such as at high SCR catalyst temperatures, if the amount of ammonia stored in the catalyst is too high, some of it may desorb and slip from the catalyst or be oxidized to $NO_x$ thereby reducing the overall $NO_x$ conversion efficiency. Therefore, the inventors have determined that in order to achieve optimal NOx reduction and minimize ammonia slip in a urea-based SCR catalyst, it is crucial to control the amount of ammonia stored in the SCR catalyst. Accordingly, since a direct measurement is not possible, the inventors have developed an accurate method to estimate the amount of ammonia stored in the SCR catalyst.

In accordance with the present invention, a method for estimating an amount of reductant stored in an exhaust gas aftertreatment device coupled downstream of an internal combustion engine, includes: injecting reductant into the device to react with a component of an engine exhaust gas mixture; and estimating the amount of reductant stored in the device based on an amount of said exhaust gas component downstream of the device.

In one embodiment of the present invention, the method is used to estimate an amount of ammonia stored in an SCR catalyst based on an amount of NOx in the exhaust gas downstream of the SCR catalyst. In one embodiment of the present invention, the amount of ammonia stored is represented by the ratio of the number of the catalyst storage sites containing adsorbed ammonia to the total number of catalyst storage sites normally available, i.e., the ammonia surface coverage fraction of the SCR catalyst.

In another embodiment of the present invention, the method includes predicting the amount of ammonia exiting the catalyst as slip based on the estimated amount of stored ammonia.

In yet another embodiment of the present invention, a method for controlling injection of a reductant into a substance to be reduced by such reductant, such reduction being facilitated by a catalyst, includes: estimating an amount of reductant stored in the catalyst based on an amount of an unreduced substance downstream of the catalyst; and adjusting an amount of reductant injected into the substance based on said estimate.

In yet another embodiment of the present invention, the method includes adjusting the amount of ammonia injected into the SCR catalyst based on the estimate of the amount of stored ammonia.

An advantage of the present invention is that an accurate estimate of the amount of ammonia stored in the SCR catalyst is obtained. Therefore, improved NOx conversion efficiency can be achieved by maintaining an optimum ammonia storage amounts in the SCR catalyst. Another advantage of the present invention is the ability to accurately predict the ammonia slip, since there are no ammonia sensors currently available commercially. Yet another advantage of the present invention is that tailpipe ammonia slip is minimized. Additionally, since the downstream NOx sensor is cross sensitive to ammonia, minimizing the ammonia slip improves the accuracy of the NOx sensor readings, and thus improves overall system NOx conversion efficiency.

The above advantages and other advantages, and features of the present invention will be readily apparent from the following detailed description of the preferred embodiments when taken in connection with the accompanying drawings, and from the claims.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein:

FIG. 2 is a truth table for selecting the proper control strategy for reductant injection.

DESCRIPTION OF PREFERRED EMBODIMENT(S)

Figure 1:
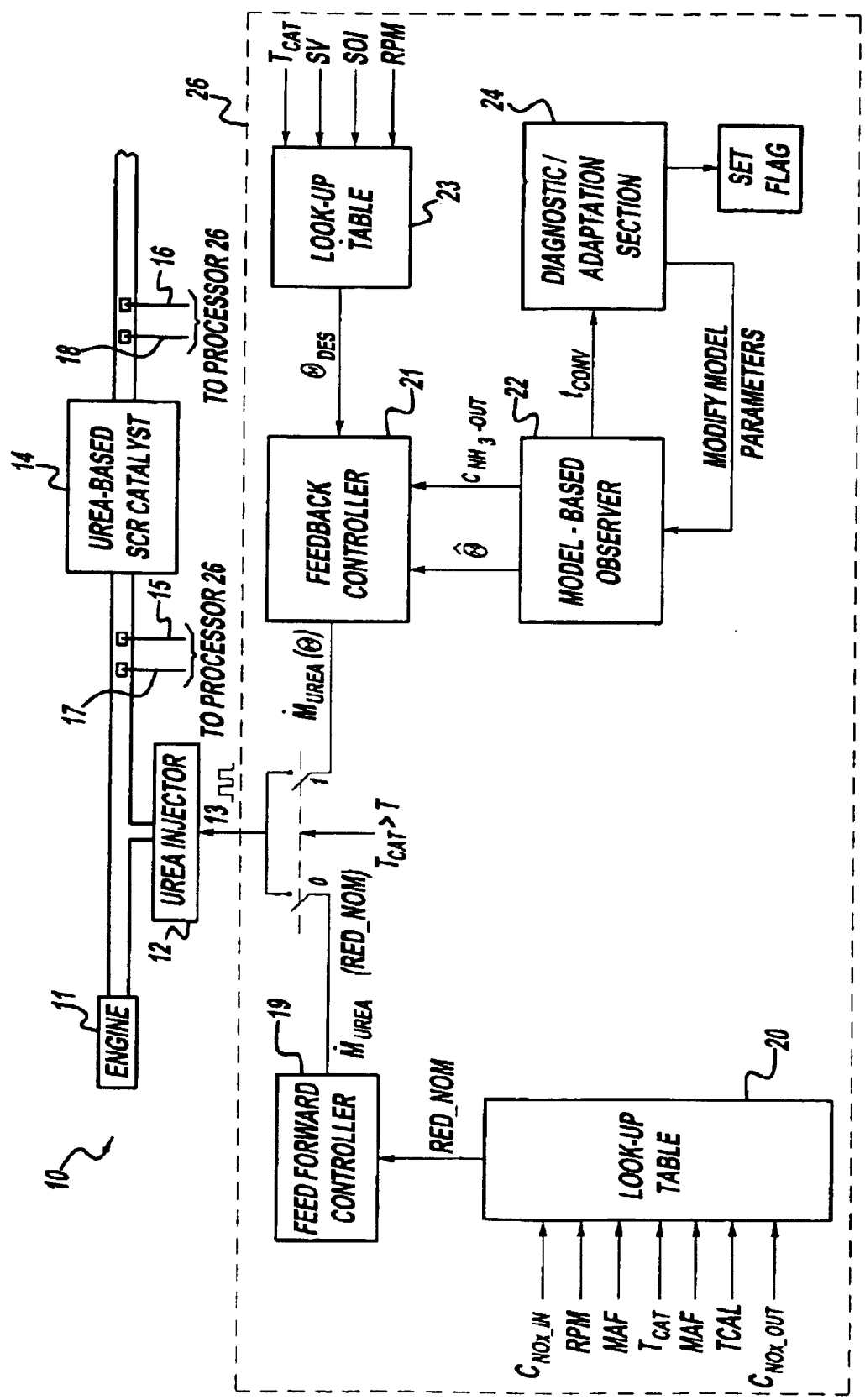
FIG. 1 is a functional block diagram of an engine exhaust system having a processor configured to reduce NOx in engine exhaust according to the invention.

Referring now to FIG. 1, an engine exhaust system 10 is shown for controlling injection of a reductant, here aqueous urea, into the exhaust gas mixture of an engine 11. More particularly, the reductant is injected into the exhaust gas mixture by an injector 12, the amount of such injection being in response to a control signal from processor 26 fed to the injector 12 on line 13. An exhaust gas aftertreatment device 14, here a urea-based SCR catalyst, is provided downstream of the reductant injection into the engine exhaust to facilitate the reaction between the reductant injected into the engine exhaust and NOx in the engine exhaust gas mixture to thereby reduce such NOx.

A pair of NOx sensors 15, 16 are provided upstream and downstream of the SCR catalyst, respectively. Measurements of the concentration of NOx in the exhaust gas mixture upstream ($C_{NOx\_in}$) and downstream ($C_{NOx\_out}$) of the SCR catalyst 14 provided by the NOx sensors are fed to a processor 26. Alternatively, NOx sensor 15 can be eliminated and the amount of NOx in the exhaust gas mixture entering the SCR catalyst can be estimated based on engine speed, load, exhaust gas temperature or any other parameter known to those skilled in the art to affect engine NOx production.

Temperature measurements upstream ($T_u$) and downstream ($T_d$) of the SCR catalyst are provided by temperature sensors 17 and 18. Processor 26 calculates catalyst temperature, $T_{cat}$, based on the information provided by sensors 17 and 18. Alternatively, any other means known to those skilled in the art to determine catalyst temperature, such as placing a temperature sensor mid-bed of the catalyst, or estimating catalyst temperature based on engine operating conditions, can be employed.

Processor 26 comprises a feedforward controller 19 and a feedback controller 20 and selects between the two based on operating conditions to produce the control signal, $m_{urea}$, on line 13. The control strategy for reductant injection is described in detail with particular reference to FIG. 2 below.

The feedforward control is based on map-based nominal reductant injection. The nominal amount of reductant injection, RED_NOM, is determined from a lookup table 20 as a function of a plurality of operating parameters including engine operating conditions and catalyst temperature, $T_{cat}$. More particularly, here RED_NOM is a function of engine speed, engine load, EGR level, start of fuel injection (SOI), catalyst temperature, $T_{cat}$, space velocity (SV), and concentration of NOx upstream ($C_{NOx\_in}$) and downstream ($C_{NOx\_out}$) of the SCR catalyst.

The feedback control is accomplished via a model-based observer 22. The model of the SCR catalyst is developed from first principles and uses global kinetics of the relevant reactions. The influence parameters of the model are estimated from empirical data for the catalyst of interest. The inputs to the observer are the concentration of injected ammonia and concentration of NOx upstream of the SCR catalyst. The outputs of observer 22 are estimates of the amount of stored ammonia in the SCR catalyst and of the concentration of gas phase ammonia downstream of the SCR catalyst. In this embodiment, the stored ammonia amount is represented by the ammonia surface coverage fraction, which can be defined as the ratio of the number of SCR catalyst sites with adsorbed ammonia to the total number of ammonia storage sites available. The SCR catalyst model includes the adsorption, desorption and surface coverage dynamics, along with the NOx reduction and ammonia oxidation dynamics based on the relevant chemical reaction rates and can be represented by the following equations:

$$\begin{bmatrix} \dot{C}_{NO} \\ \dot{\theta} \\ \dot{C}_{NH3} \end{bmatrix} = \begin{bmatrix} -C_{NO}\left(\Theta_{SC}\overline{R}_{RED}\theta + \dfrac{F}{V_{cat}}\right) + \Theta_{SC}\overline{R}_{OX}\theta \\ -\theta(\overline{R}_{ADS}C_{NH3} + \overline{R}_{DES} + \overline{R}_{RED}C_{NO}\overline{R}_{OX}) + \overline{R}_{ADS}C_{NH3} \\ -C_{NH3}\left(\Theta_{SC}\overline{R}_{ADS}(1-\theta) + \dfrac{F}{V_{cat}}\right) + \overline{R}_{DES}\Theta_{SC}\theta \end{bmatrix} + \quad (1a)$$

$$\begin{bmatrix} 0 \\ 0 \\ \dfrac{F}{V_{cat}} \end{bmatrix} U + \begin{bmatrix} \dfrac{F}{V_{cat}} \\ 0 \\ 0 \end{bmatrix} d$$

$$Y = [1 \ 0 \ 0] \begin{bmatrix} C_{NO} \\ \theta \\ C_{NH3} \end{bmatrix} \quad (1b)$$

where:

$$\overline{R}_j = k_j \exp\left(\dfrac{-E_j}{RT}\right); \ j = ads, des, red, ox.$$

$E_j$: Activation energy for reaction j=ads, des, red, ox.
$R_j$: Reaction rate for reaction j=ads, des, red, ox.
$k_j$: Pre-exponential terms for reaction j. [vol/mole]
$C_x$: Concentration of species x [mole/vol].
$\theta_{NH3}$: Surface coverage fraction [dimensionless].
$\Theta_{SC}$: Total ammonia storage capacity [moles/vol].
R: Universal gas constant [kJ/kmole/K].
T: Temperature [Kelvin].
Y: Output concentration of NO, ($C_{NO}$), available as measurement [mole/vol].
U: Inlet concentration of $NH_3$, ($C_{NH3}^{in}$), [mole/vol].
d: Is a known and bounded disturbance input→inlet concentration of NO, ($C_{NO}^{in}$), [mole/vol].
F: Constant flow rate through catalyst [$m^3$/sec].
$V_{cat}$: Catalyst volume [$m^3$].

The activation energies may be functions of temperature, inlet concentrations, or other quantities that can be measured or estimated. The model for ammonia storage may also be a different one than expressed by above Arrhenius Equations (1a) and (1b).

Since the only measurement available in this system is the NOx concentration downstream of the SCR catalyst, the observer for the surface coverage fraction and the ammonia slip concentration takes the form:

$$\dfrac{d}{dt}\hat{x} = f(\hat{x}, U, d) + L \cdot (\hat{C}_{NOx} - C_{NOx})$$

where $\hat{x} = [\hat{C}_{NOx}, \hat{\theta}, \hat{C}_{NH3}]$ denotes the observer states, f denotes the nonlinear system dynamics of the SCR catalyst as shown in Equations 1a and 1b, and L is any function of the error $\epsilon = (\hat{C}_{NOx} - C_{NOx})$ which renders the dynamics of the error system asymptotically stable. The two outputs of the observer 22 (estimated ammonia surface coverage fraction, $\hat{\theta}$, and the estimated concentration of gas phase ammonia downstream of the SCR catalyst, $\hat{C}_{NH3out}$) are provided to the feedback controller 21. Further, feedback controller 21 determines desired ammonia surface coverage fraction, $\theta_{des}$, from either a look-up table 23 based on operating conditions, such as catalyst temperature, engine speed, load, start of injection, space velocity, etc., or from some finite or infinite horizon optimal control law, and generates a control signal on line 13 based on $\hat{\theta}$ and $\theta_{des}$. Alternatively, feedback controller 21 can generate a control signal based on estimated and desired amount of ammonia downstream of the SCR catalyst.

Feedback controller 21 could be defined as any controller, U, that renders the closed loop system asymptotically stable such as, for example:

$$U = K \cdot \epsilon, \text{ or}$$

$$U = K \cdot \text{sign}(\epsilon)$$

Additionally, observer 22 provides convergence time information (the time that it takes for the measured and estimated amounts of NOx in the exhaust gas mixture downstream of the SCR catalyst to come within a small predetermined value, $\epsilon$, of each other) to a diagnostic/adaptation section 24. If the convergence time is greater than a predetermined time constant, $t_{conv}$, indicating that the catalyst model accuracy has been reduced due to such factors as, for example, aging of the catalyst or catalyst poisoning, section 24 initiates an adaptation scheme to reflect the altered behavior by adjusting, for example, the total storage capacity of the catalyst to account for the loss of storage sites due to catalyst aging or poisoning. The adjustment value is generated based on operating conditions and the length of convergence time. Additionally, diagnostic/adaptation section 24 may set a catalyst degradation signal in response to an increased convergence time.

Referring now to FIG. 2, a truth table for switching between feedforward controller 19 or feedback controller 21 is described.

Condition 1 occurs when the exhaust gas temperature at the reductant injection point, $T_{inj}$ is below a first predetermined threshold, $T_1$ (170 deg. C. in a preferred embodiment). Since the injected urea does not decompose to ammonia and hydro-cyanic acid until $T_{inj}$ is above $T_1$, any urea injection will result in urea accumulation in the exhaust pipe and/or deposition of urea on the catalyst face. This will lead to inefficient conversion and excess ammonia slip. $T_{inj}$ can be estimated based on $T_1$, or based on operating conditions, such as engine speed, load, coolant temperature, etc. Therefore, for Condition 1, controller 26 disables reductant injection.

Condition 2 describes a condition wherein $T_{inj}$ is above $T_1$, but $T_{cat}$ is below a second predetermined temperature threshold, $T_2$ (200° C. in a preferred embodiment). Condition 2 applies at engine start up or at stop (idle) conditions. In this temperature range, NOx conversion efficiency of the SCR catalyst is very low and the feedforward controller is used to inject reductant to allow ammonia storage in the catalyst. $\theta_{threshold}$ is a threshold amount of ammonia storage that is required for improved NOx conversion once the SCR catalyst is within the optimum NOx conversion temperature range (50% in a preferred embodiment). At start up conditions, the $\theta$ value will be available from KAM (keep alive memory of the processor 26) of the last operational engine state prior to key off. For idle conditions, since the engine has already been running the predicted value of $\theta$ will be available for comparison with $\theta_{threshold}$. Once the desired amount of ammonia storage is achieved, reductant injection may be discontinued until Condition 3 is satisfied. This prevents over-storage of ammonia on the catalyst and thereby reduces ammonia slip during accelerations.

Condition 3 occurs when $T_{cat} \geq 200$ deg C. and model-based observer convergence $>\epsilon$ (i.e., the difference between measured and estimated amounts of NOx in the exhaust gas mixture downstream of the SCR catalyst is greater than a small predetermined value, $\epsilon$). In other words, processor 26 does not switch to the feedback control of reductant injection until acceptable convergence between the measured and estimated NOx concentration downstream of the SCR catalyst is achieved (i.e., the difference between the two is less than or equal to a small predetermined error value, $\epsilon$). The achievement of convergence between the measured and estimated NO$_x$ concentration values implies that the predicted value for the surface coverage fraction is accurate and can now be used in feedback control.

Condition 4 occurs when $T_{cat} \geq 200$ deg C. and model-based observer convergence $<\epsilon$. Under these conditions processor 26 switches to feedback control of reductant injection using the model-based observer 22.

Therefore, according to the present invention, it is possible to obtain an accurate estimate of the amount of ammonia storage in a catalyst by using a model-based observer of catalyst behavior. In a preferred embodiment, the observer generates an estimate of the ammonia surface coverage fraction of the SCR catalyst based on NOx concentration upstream and downstream of the catalyst, and the concentration of ammonia injected into the catalyst to facilitate NOx reduction. The output of the observer can then be used to adjust the amount of reductant injected into the catalyst thereby achieving desired ammonia surface coverage fraction to minimize ammonia slip and optimize NOx conversion efficiency of the catalyst. Further, by monitoring observer convergence time, the model is continuously updated to account for poisoning or thermal aging of the catalyst, as well as for different operating temperatures. Additionally, switching between feedforward and model-based feedback control of reductant injection based on operating conditions prevents over and under injection of reductant, minimizes tailpipe ammonia slip and improves overall emission control system efficiency.

This concludes the description of the invention. The reading of it by those skilled in the art would bring to mind many alterations and modifications without departing from the spirit and the scope of the invention. Accordingly, it is intended that the scope of the invention be defined by the following claims.

What is claimed is:

1. A method for controlling injection of a reductant into a substance to be reduced by such reductant, such reduction being facilitated by a catalyst, such method comprising:
   estimating an amount of reductant stored in the catalyst based on an amount of an unreduced substance downstream of the catalyst;
   estimating an amount of reductant in said engine exhaust gas mixture downstream of the device based on said estimated amount of reductant stored in the device; and
   adjusting an amount of reductant injected into the substance based on said estimate and a desired amount of stored reductant and further based on said amount of reductant in said exhaust gas mixture downstream of the device, to control said amount of reductant stored in the catalyst at said desired amount and thereby reduce reductant desorption during high catalyst temperature.

2. The method as set forth in claim 1 wherein said amount of injected reductant is adjusted to minimize an amount of unreduced substance exiting the catalyst.

3. The method as set forth in claim 1 wherein the catalyst is an SCR catalyst.

4. The method as set forth in claim 3 wherein the reductant is ammonia.

5. The method as set forth in claim 4 wherein the substance is NOx.

6. The method as set forth in claim 5 wherein said amount of ammonia stored in the catalyst is a ratio of a number of SCR catalyst storage sites containing ammonia to a total number of ammonia storage sites available.

7. The method as set forth in claim 6 wherein said total number of catalyst storage sites available is a calibratable value based on catalyst properties.

8. The method as set forth in claim 7 wherein said calibratable value is adjusted to account for catalyst poisoning.

9. The method as set forth in claim 8 wherein said calibratable value is further adjusted based on operating conditions.

10. The method as set forth in claim 9 wherein said operating conditions comprise an SCR catalyst temperature.

11. A system for improving conversion efficiency of an emission control system coupled downstream of a diesel engine, comprising:

an SCR catalyst;

a sensor coupled downstream of said SCR catalyst, said sensor providing a measure of an amount of NOx in an exhaust gas mixture downstream of said catalyst; and an injector supplying ammonia into said SCR catalyst based on a signal from a controller, said controller estimating an amount of ammonia stored in said SCR catalyst as a result of said injection based on at least said measure of NOx downstream of said catalyst and adjusting said injector signal based on said estimated amount of stored ammonia, an amount of ammonia downstream of said catalyst, and a desired amount of stored ammonia to control said amount of ammonia stored in the catalyst at said desired amount, and thereby reduce ammonia desorption during high catalyst temperature.

12. The system as set forth in claim 11 wherein said amount of ammonia stored in the catalyst is a ratio of a number of SCR catalyst storage sites containing ammonia to a total number of ammonia storage sites available.

13. A method for controlling injection of a reductant into a substance to be reduced by such reductant, such reduction being facilitated by a catalyst, such method comprising:

estimating a reductant surface coverage ratio relative to a reductant storage capacity based on an operating parameter;

determining a desired amount of stored reductant based on an operating condition;

adjusting an amount of reductant injected into the substance based on said estimate and said desired amount to control said amount of reductant stored in the catalyst at said desired amount, and thereby reduce reductant desorption during high catalyst temperature.

* * * * *